April 3, 1951 — C. E. REISTLE, JR — 2,547,778
METHOD OF TREATING EARTH FORMATIONS
Filed July 5, 1949
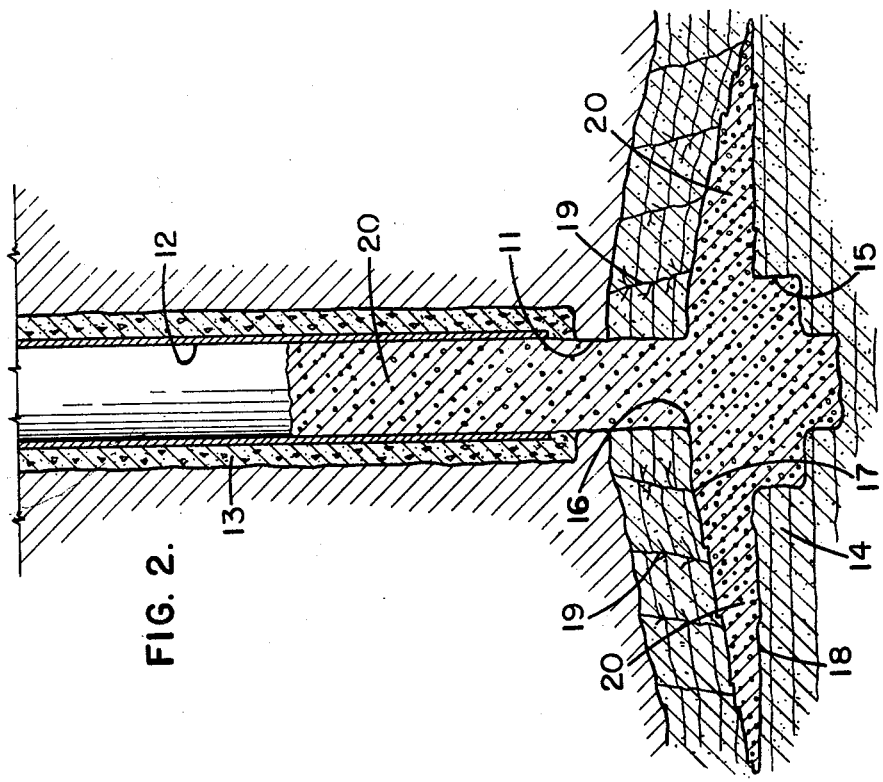
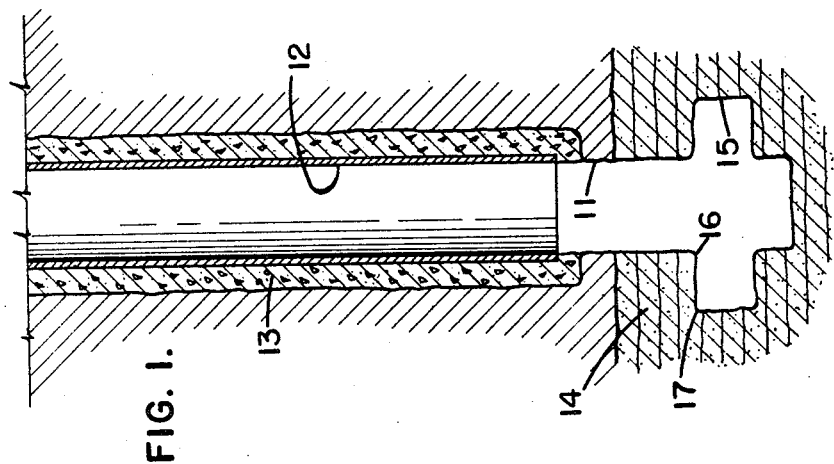
INVENTOR.
Carl E. Reistle Jr.,
BY Earl Babcock,
ATTORNEY.

Patented Apr. 3, 1951

2,547,778

UNITED STATES PATENT OFFICE 2,547,778

METHOD OF TREATING EARTH FORMATIONS

Carl E. Reistle, Jr., Houston, Tex., assignor, by mesne assignments, to Standard Oil Development Company, Elizabeth, N. J., a corporation of Delaware Application July 5, 1949, Serial No. 103,075

7 Claims. (Cl. 166—21)

This invention relates to a process for treating earth formations to increase the production of fluids therefrom and particularly to a process for lifting and fracturing or "breaking down" earth formations.

It has been common practice for many years to treat earth formations producing oil or gas by "shooting" them with explosives. In this way, the effective volume of the borehole at a particular formation is enlarged. To accomplish the same purpose, acids have been caused to react with producing formations, particularly limestone or sandstone having some calcareous content.

Recently it has been proposed to squeeze jellied gasoline or the like into a well bore to fracture oil-producing formations, this being known as the "hydrafrac process." Under this process, the jellied gasoline is of very high viscosity when pumped into the well bore. Its viscosity is so high that for a time the formation fissures and channels are completely clogged. In order to make an oil well, it is then necessary to cause a change in viscosity of the jellied gasoline, after the fracturing of the formation occurs, so that it can be removed from the formation to permit the oil to enter the bore.

The ability to cause a remotely located liquid to change its viscosity at a given time and to control that change with any degree of accuracy is difficult.

In accordance with the present invention, liquids are used for squeeze fracturing an earth formation which do not have such high viscosities as jellied gasoline. These liquids can therefore be removed from the formation without a material change in viscosity occurring during the treating process.

The selection of very high viscosity liquids for use in the "hydrafrac" process is based upon the assumption that lower viscosity liquids will not perform the fracturing operation in a satisfactory manner. The present invention is based upon the assumption that lower viscosity liquids can be used to fracture a formation in a satisfactory manner, if certain conditions are first established in the formation or the portion thereof where fracturing is needed.

The present invention involves two essential features, first the step of under-reaming of a selected portion of the borehole, and secondly, the step of placing a hydrostatic pressure on the selected portion of the formation in order to fracture the formation. The hydrostatic pressure may be exerted in several ways. If a liquid of a selected, substantially constant viscosity is used and if the pumping rate and other factors are taken into account, the formation may be fractured without taking any special steps to insure fracturing and ultimate removal of the fracturing liquid from the formation. However, in some instances at least it is preferable to provide a suitable filter cake along the portion of the formation to be fractured as well as other portions of the borehole, in order to confine the fracturing liquid, at least initially, and prevent it from flowing away from the borehole too rapidly. Where a filter cake is employed, the fracturing liquid may have a lower viscosity and may not have a substantially constant viscosity.

Of course, temperature, pressure, dilution or contamination and other factors affect the viscosity of any liquid pumped into a well bore, and the term "substantially constant viscosity" is not used in this specification or in the claims in the laboratory sense. The term is here used to signify a liquid which is not purposely treated in such a way as to bring about a marked change in viscosity after a predetermined time due to causes other than those normally encountered in a well bore.

In practicing the present invention, sand or gravel may be mixed with the liquid used to do the fracturing before it is pumped into the well bore to assist in maintaining channels of flow after the fracturing occurs. It has long been known that such agents may be pumped into fissures in earth formations. (See U. S. patent to Benckenstein, No. 2,354,570, granted July 25, 1944.)

Accordingly, it will be apparent that the object of the invention is to devise a novel method of treating earth formations to fracture or "break down" the same in which a borehole is drilled into the formation and then under-reamed, after which a hydraulic pressure is applied to the under-reamed portion of the hole. To this end, the method may consist of drilling a borehole into the formation, under-reaming the formation or a portion thereof, then forcing a liquid of substantially constant viscosity into the borehole to cause the formation or portion thereof to fracture and then removing the liquid from the formation by swabbing or the like to cause the connate fluid therein to flush the formation and force the fracturing liquid back into the borehole. Secondly, the method may be performed by using as the fracturing agent a liquid which may not be of substantially constant viscosity (whether it is or not then being unimportant) by preventing or reducing the flow of the liquid into the under-reamed portion of a borehole by the creation of a suitable filter cake therein either prior to or simultaneously with the forcing of the liquid into the borehole.

The objects and advantages of the invention reside in certain novel features of the method as will be apparent from the following description taken in connection with the accompanying drawings in which Fig. 1 is a diagrammatic cross-sectional representation of the lower end of a cased borehole in the earth and illustrating the step of under-reaming a portion of a producing formation in accordance with the principles of the invention;

Fig. 2 is a diagrammatic cross-sectional representation of the lower end of the borehole shown in Fig. 1 after hydraulic pressure has been exerted on the under-reamed portion of the formation to fracture the same.

Referring to the drawing in detail, it will be seen that a borehole is indicated at 11 in Fig. 1, the hole being provided with a casing 12 held in place by cement 13. The borehole terminates in a producing formation 14 and, as shown, a portion of the hole in this formation is under-reamed or enlarged as shown at 15.

The conditioning of the hole, as shown in Fig. 1, prior to any pressure exerting operation is an important step in the process of the present invention and involved several considerations.

To fracture or "break down" a formation in the earth, tremendous pressures must be exerted. The entire overburden above the formation must be lifted. Of course, the hydrostatic head of the column of liquid in the borehole is of assistance in creating the necessary pressure but nevertheless high pump pressures at the surface of the ground must be employed if the liquid is to be forced into the formation to accomplish this lifting action.

It is very desirable, therefore, to cause, insofar as possible, all of the lifting force to be applied at the exact depth in the well bore where the fracturing is to occur.

Under-reaming of the particular formation or zone to be fractured makes it possible to localize the lifting action of the liquid under pressure without necessarily using packers. The action is twofold. In the first place, the under-reaming weakens the formation at the point where it is desired to create the fracture. Secondly, the nature of the under-reamed hole is such that the total lifting force on the formation in it is greater than it is in a smooth cylindrical borehole. The action is, in effect, that of a hydraulic jack. The annular area between the shoulder 16 and the outer wall 17, as shown in Fig. 1, is subjected to the upward forces caused by hydrostatic pressure of the liquid.

Whenever a formation is broken down or fractured hydraulically upward forces must be exerted, but when the borehole is not under-reamed, these lifting forces are not exerted until the liquid penetrates some distance horizontally into the formation. This is so because, obviously, the hydrostatic pressure of the liquid has no vertical upward component so long as the wall of the borehole remains cylindrical.

Thus, by under-reaming the entire nature of the fracturing or breaking down of the formation is different than that employed where the step of under-reaming is not performed. The same forces are exerted horizontally against the wall of the bore, in one case as in the other, but where the step of under-reaming is first employed, the formation is weakened mechanically and a large lifting force is applied to it at the same time. Thus, the formation gives way at a much lower pump pressure than is necessary under other conditions.

With the well bore thus conditioned, the next step in the process may be performed as illustrated in Fig. 2. Before fracturing the formation, its permeability should be determined, as by taking samples and examining them. Knowing the depth and permeability of the formation and the rate and working pressure of the pumping equipment, it is possible to select a liquid of proper viscosity which can be injected into the formation at a rate sufficiently high to cause fractures to occur only in the zone which has been under-reamed. As indicated above, the fracturing step may be performed without the use of packers, although the invention is not to be regarded as limited in this respect. If the fracturing liquid is pumped into the well through tubing, the tubing may be secured to the casing 12 by means of a packer, as is common practice in squeeze cementing operations. Of course, open hole packers may also be used, if desired. Where a packer is used, it adds to the effective area subjected to a lifting pressure by the fracturing liquid.

In Fig. 2 the fractures 18 and 19 shown are greatly exaggerated for purposes of illustration. The large horizontal fractures 18 are shown as filled with fracturing liquid carrying sand or gravel, while the vertical artificial fractures 19 are shown as less extensive artificially created faults caused by the vertical upheaval due to the lifting action of the fracturing liquid 20.

As liquids suitable for use in fracturing formations in accordance with the present invention, oil, water and dilute hydrochloric acid may be mentioned. If acid is used it may chemically react with the formation to enlarge the fissures thereof while it is being injected into the formation or thereafter. Under some conditions oil is deemed the most suitable liquid for the purpose, as it does not contaminate oil-bearing rock, as does water, and its viscosity can be easily controlled as by mixing with it suitable soaps, as is well known to those skilled in the art of making oil base drilling fluids.

In an oil-producing formation, oil treating fluid can perhaps be removed easier than an aqueous treating fluid. (See "The Flow of Homogeneous Fluids through Porous Media" by M. Muskat, copyright 1937, McGraw Hill Book Co., pages 478 to 480.)

Under some conditions liquids of very low viscosity may be employed although it is recognized that if sand or gravel are mixed with the liquid being squeezed, the liquid should have sufficiently high viscosity to suspend the particles of such materials uniformly. Under other conditions liquids of reasonably high viscosities may be employed, but in no event should the viscosity of the liquid be so high that the formation becomes clogged thereby after it has been fractured.

In those cases where a filter cake is not formed in the under-reamed portion of the well bore, or where the conditions therein are not definitely known, a general rule, though not an invariable one, is that the higher the permeability of the formation to be fractured, the higher the viscosity of the liquid used. This rule is suggested because of the relation of pumping rate to permeability. If the formation is very permeable the resistance to flow of any liquid is not great and large quantities of liquid must be pumped in a short time in order to build up the necessary lifting and fracturing pressure. The cost of the liquid used may become excessive under such conditions. If its viscosity is increased, the resistance to flow offered by the formation increases and the lifting pressure can be built up much quicker. Other factors, such as the capacity of the pumping equipment available on a particular well, enter into a determination of the viscosity of the liquid selected for use of the method.

As indicated above, consideration of the viscosity of the liquids used in the process may not always be important. This is particularly true if a filter cake is formed in the under-reamed portion of the formation to be fractured. In performing the under-reaming step, the filter cake formed by the drilling mud during drilling operations may be destroyed or weakened. It is preferable in most instances to cause the filter cake to form again in the under-reamed portion before forcing the fracturing liquid into the borehole. The fracturing liquid may be confined and caused to exert hydraulic pressure in the under-reamed portion by the filter cake per se and it may then be of very low viscosity.

It is important to confine the fracturing liquid for if it can readily flow off into the formation it will not exert the required hydraulic pressure to lift the overburden, but most oil-producing formations have such permeabilities and to permit the required fracturing pressures to be built up either by the selection of a proper viscosity for the fracturing liquid or by the creation of a suitable filter cake in the under-reamed portion by the use of conventional mud agents such as bentonitic clay circulated in the borehole either before the fracturing liquid is pumped down or by placing such agents in the fracturing liquid itself.

While the invention has been illustrated and described herein rather specifically, it will be obvious to those skilled in the art that the process may be performed in various ways. Thus while the drawing illustrates the process as applied to a formation at the bottom of the drill hole, it can also be applied anywhere in an open hole and the phrase "selected portion of the borehole" as used in the claims is not to be construed as limited to bottom hole formations. It is also to be understood that in performing the under-reaming step, chemical or hydraulic dissolution of the formation may be employed either in addition to or in lieu of the use of conventional mechanical cutters. The word "under-reaming" as used herein is to be regarded as including all such operations. The invention is not limited except by the recitals in the annexed claims.

I claim:

1. A method of treating an earth formation for the purpose of increasing the production of a fluid therefrom which includes the steps of drilling a borehole into the formation, under-reaming a selected portion of the borehole in the formation to weaken the same and to increase the area subjected to lifting forces when hydrostatic pressure is applied and then pumping a liquid into the borehole and applying a hydraulic pressure on the liquid and on the selected portion of the formation sufficient to fracture the formation.

2. A method of treating an earth formation for the purpose of increasing the production of a fluid therefrom which consists in drilling a borehole into the formation, under-reaming a selected portion of the borehole in the formation to weaken the same and to increase the area subjected to lifting forces when hydrostatic pressure is applied, then pumping into the under-reamed portion of the borehole and into the formation a liquid having substantially constant viscosity, applying hydrostatic pressure to the liquid of such a value as to lift the formation and fracture the same and then removing the liquid from the formation.

3. A method of treating a formation in the earth for the purpose of increasing the production of a fluid therefrom which includes the steps of drilling a borehole into the formation, under-reaming a selected portion of the borehole in the formation to weaken the same and to increase the area subjected to lifting forces when hydraulic pressure is applied, forming a filter cake on the wall of the under-reamed portion and pumping a liquid into the borehole, applying a hydrostatic pressure on the liquid and the selected portion of the formation to fracture the formation, the filter cake being used to assist in confining the fracturing liquid while it is being pumped.

4. A method of treating a formation in the earth for the purpose of increasing the production of a fluid therefrom which includes the steps of drilling a borehole into the formation, under-reaming a selected portion of the borehole in the formation to weaken the same and to increase the area subjected to lifting forces when hydraulic pressure is applied, mixing with a fracturing liquid a material capable of forming a filter cake on the wall of the under-reamed portion and pumping said liquid into the borehole under pressure to cause a filter cake to form, applying hydrostatic pressure on the liquid and on the selected portion of the formation to fracture the formation, the filter cake being used to assist in confining the fracturing liquid while it is being pumped.

5. A method of treating a formation in the earth for the purpose of increasing the production of a fluid therefrom which includes the steps of drilling a borehole into the formation, under-reaming a selected portion of the borehole in the formation to weaken the same and to increase the area subjected to lifting forces when hydrostatic pressure is applied, then pumping a liquid into the under-reamed portion of the borehole and into the formation and applying hydrostatic pressure on the liquid and on the selected portion of the formation to fracture the formation.

6. A method of treating a formation in the earth for the purpose of increasing the production of a connate fluid therefrom which includes the steps of drilling a borehole into the formation, under-reaming a selected portion of the borehole in the formation to weaken the same and increase the area subjected to lifting forces when hydrostatic pressure is applied, forming a filter cake on the wall of the under-reamed portion, pumping a fracturing liquid into the borehole, applying pressure on the liquid to place a hydrostatic pressure on the selected portion of the formation to fracture the same, the filter cake being used to assist in confining the fracturing liquid while it is being pumped and then removing some of the fracturing liquid from the borehole to cause the connate fluid in the formation to flush the fracturing liquid from the fractured formation.

7. A method of treating a formation in the earth for the purpose of increasing the production of a connate fluid therefrom which consists in drilling a borehole into the formation, under-reaming at least a portion of the formation, then forcing into the under-reamed portion of the formation a fracturing liquid of substantially constant viscosity under such a pressure as to lift at least a portion of the formation as well as the overburden and cause the portion of the formation to fracture, and then removing some of the fracturing liquid from the borehole to cause the connate fluid in the formation to flush the fractured portion of the formation and force fracturing liquid back into the borehole.

CARL E. REISTLE, Jr.

REFERENCES CITED

The following references are of record in the file of this patent:

UNITED STATES PATENTS

| Number | Name | Date |
|---|---|---|
| 2,018,284 | Schweitzer et al. | Oct. 22, 1935 |
| 2,271,005 | Grebe | Jan. 27, 1942 |
| 2,354,570 | Benckenstein | July 25, 1944 |
| 2,379,516 | Garrison | July 3, 1945 |

OTHER REFERENCES

Clark, "Hydrafrac Process for Increasing the Productivity of Wells," The Petroleum Engineer, Reference Annual, 1949, B–3, Oct. 4–6, 1948.

Notice

In an interference involving Patent No. 2,547,778, C. E. Reistle, Jr., Method of treating earth formations, final judgment adverse to the patentee has been rendered as to claims 1, 2, 3, 4, 5, 6, and 7.